C. A. NORMAN.
TRAP.
APPLICATION FILED JULY 7, 1916.

1,249,995.

Patented Dec. 11, 1917.

WITNESSES
Rolande Williams.
H. H. Babcock

INVENTOR
Charlie A. Norman
BY Richard Bowen
ATTORNEY

UNITED STATES PATENT OFFICE.

CHARLIE A. NORMAN, OF FRANKFORT, SOUTH DAKOTA.

TRAP.

1,249,995.

Specification of Letters Patent.

Patented Dec. 11, 1917.

Application filed July 7, 1916. Serial No. 108,033.

*To all whom it may concern:*

Be it known that I, CHARLIE A. NORMAN, a citizen of the United States, residing at Frankfort, in the county of Spink and State of South Dakota, have invented certain new and useful Improvements in Traps, of which the following is a specification.

This invention relates to traps, and more particularly to traps for catching rats, gophers, and similar animals.

One of the main objects of the invention is to provide a trap of simple construction and operation which is capable of catching a large number of animals at one time. A further object is to provide a trap so constructed as to not exclude the light so that the animals to be caught will readily enter.

Figure 1:
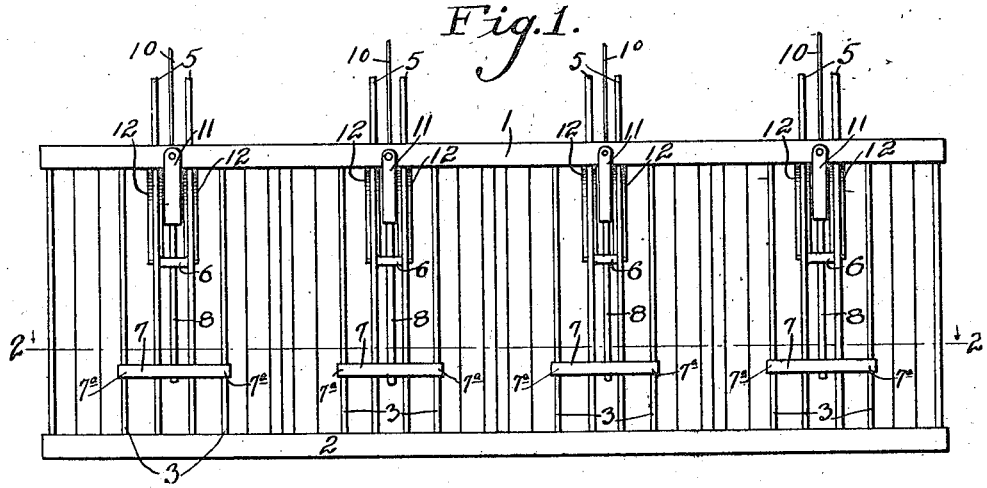
Figure 1 is a front view of the trap when sprung.
Figure 2:
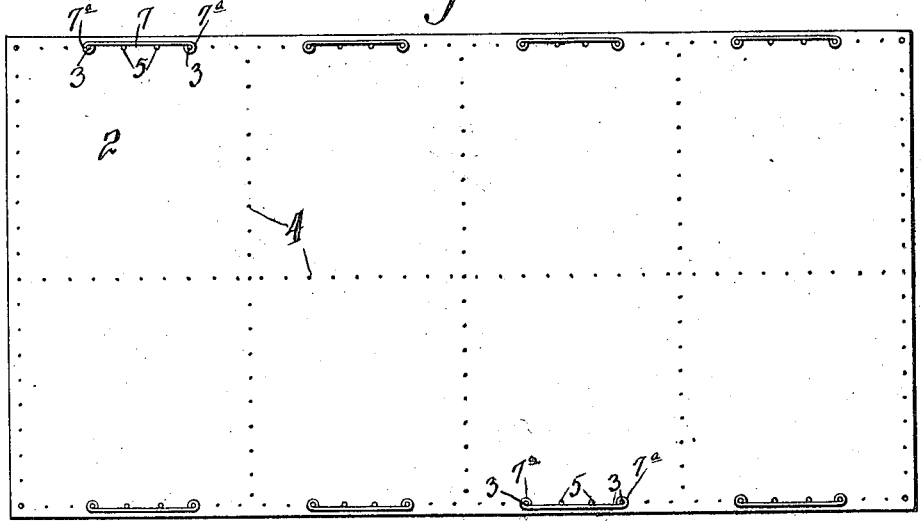
Fig. 2 is a section on line 2—2 of Fig. 1.
Figure 3:
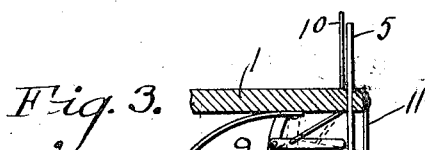
Fig. 3 is a fragmentary detail sectional view.

The casing or frame of the trap is composed of upper and lower plates 1 and 2 secured together by vertical rods 3. The space between plates 1 and 2 is divided, by longitudinally and transversely arranged wire partitions 4 into a number, in this case eight, compartments.

Each compartment of the trap is provided, at its outer end, with a vertically slidable door. This door is composed of two parallel rods 5 which are slidable through openings in the top plate 1. These rods have their lower ends pointed and adapted to be seated in suitable recesses in the bottom plate 2. A bar 6 is fixedly secured to the rods 5 at a point above their center so as to rigidly connect the same. Near the lower end of the rods 5 is secured a guide strip 7. This strip has its ends bent to form guide sleeves 7ª which are slidable on the rods 3 securing the top and bottom plates together.

At the center of each compartment and near the front thereof, a trigger lever 8 is pivoted at its upper end in top plate 1. An arm 9 is pivoted at its inner end to lever 8 near the upper end thereof. This arm is positioned in that vertical plane which is located midway the rods 5. Arm 9 may be raised by means of a cord 10 secured thereto and passing through the aperture in plate 1. This arm is adapted to coöperate with a resilient hook 11 secured to the front edge of plate 1 in alinement therewith. A leaf spring 12 is positioned at each side of the lever 8 with its upper end secured to plate 1 and its lower end secured to one of the rods 5 in alinement with the bar 6. These springs are positioned equidistant from the lever 8 so that they exert equal downward pressure on the rods thus insuring true movement of the same and preventing binding of the rods during their movement through plate 1, or of the guide bar 7 on rods 3.

In order to set the trap, the upper ends of the rods 5 may be grasped and the rods raised against the action of spring 12 so as to bring the bar 6 above the inturned end of hook 11. With the bar in this position, lever 8 is swung outwardly and the arm 9 is raised, by means of cord 10, so as to pass beneath the bar 6 and over top of the horizontal arm or hook 11. With the arm 9 in this position, the rods 5 are released. When the rods are released the arm engages bar 6 and acts to hold the door in raised position. The arm is so positioned on lever 8 that, when in operative position, it is slightly inclined downwardly and outwardly. This produces a very sensitive set for the trap which insures its being sprung as soon as it is attempted to remove the bait from the lower end of lever 8.

If, for any reason, the animal enters the compartment without having sprung the trap, and attempts to remove the bait from lever 8, the trap will be sprung so as to prevent the escape of the animal from the trap. On the other hand, if the trap operates properly, it will be sprung while the animal is reaching underneath of the rods 5 and attempting to get the bait. In this case, the springs 12 will drive the rods down, the lower pointed ends of the rods piercing the animal's body and killing it instantly.

By using wire partitions to divide the trap into compartments, very little light is excluded so that the animal will readily enter the trap, there not being any darkened compartments to frighten it.

There may be slight variations made in the construction and arrangement of the different parts of my invention without departing from the field and scope of the same, and I intend to include all such variations in this application, in which a preferred form only of my invention is shown,

What I claim, is:

In a trap, top and bottom plates, rods secured in said plates so as to form an inclosure therewith, two parallel rods slidable through the top plate, a cross bar secured between said rods, an inwardly directed hook secured to the top plate and extending downwardly in front of the slidable rods, a lever mounted in the top plate, an arm pivoted at its inner end to said lever below the pivot point thereof and in alinement with said hook, the cross bar being so positioned as to hold the slidable rods in raised position when the arm is inserted beneath said bar and engaged with the hook, said hook acting as a housing for protecting the outer end portion of said arm so as to prevent accidental displacement thereof, and means for forcing said slidable rods downwardly.

In testimony whereof I affix my signature in presence of two witnesses.

CHARLIE A. NORMAN.

Witnesses:
 JOHN C. BAHDE,
 R. I. COLEMAN.